United States Patent [19]

Maus et al.

[11] Patent Number: 5,340,303
[45] Date of Patent: Aug. 23, 1994

[54] FASTER CYCLING SPRUE FOR CENTERHOLE - TEAROUT OPTICAL DISK INJECTION MOLDS

[75] Inventors: Steven M. Maus, Osseo; George J. Galic, Columbia Heights, both of Minn.

[73] Assignee: Galic Maus Ventures, Columbia Heights, Minn.

[21] Appl. No.: 94,830

[22] Filed: Jul. 20, 1993

[51] Int. Cl.⁵ .............................................. B29C 45/40
[52] U.S. Cl. ..................................... 425/549; 425/556; 425/577; 425/436 R; 425/444; 425/810; 264/107
[58] Field of Search ............... 425/549, 554, 556, 444, 425/436 R, 436 RM, 810, 568, 577; 264/106, 107

[56] References Cited

U.S. PATENT DOCUMENTS

| | | | |
|---|---|---|---|
| 2,306,316 | 4/1939 | Marsh | 425/568 |
| 4,069,003 | 1/1978 | Cecchi | 425/568 |
| 4,466,934 | 8/1984 | Cane et al. | 425/810 |
| 4,738,613 | 4/1988 | Eichlseder | 425/556 |
| 4,880,587 | 11/1989 | Eichlseder | 264/154 |
| 5,018,962 | 5/1991 | Kitamura et al. | 425/556 |
| 5,068,065 | 11/1991 | Maus | 264/1.3 |
| 5,098,281 | 3/1992 | Kitamura | 425/553 |

FOREIGN PATENT DOCUMENTS 63-237921  10/1988  Japan .................... 425/810

*Primary Examiner*—Khanh Nugyen

[57] ABSTRACT

Faster injection molding cycles in an optical disk mold which forms the centerhole by tearing out the sprue can be obtained by increasing the "hot strength" of the sprue by addition of a plurality of rigidifying ribs onto only the B side of the sprue. This plurality of molded-in ribs is formed within a mating plurality of female cavities cut into the axially displaceable ejector sleeve, within which is guided an axially displaceable ejector pin, all within the displaceable half of the moldset. These ribs are circumferentially spaced and extending between the B side displaceable half surface of the sprue flange (substantially located within the plane of the molded disk) and extending substantially downstream to the juncture with the ejector pin surface of the mold. Increased resistance to plastic deformation by the ejector pin prevents the ejector pin from tearing through the still-hot plastic while stripping the sprue off undercuts, yet avoids certain geometries of the ribs which also cause flow disturbances and unacceptable molded-in stresses during melt injection of the optical disk.

9 Claims, 2 Drawing Sheets

COMPARATIVE EXAMPLE

FASTER CYCLING SPRUE FOR CENTERHOLE - TEAROUT OPTICAL DISK INJECTION MOLDS

FIELD OF THE INVENTION

This invention relates to an improved apparatus for faster injection molding of plastic optical disks. Specifically, faster molding cycles and higher outputs can be obtained by the greater "hot strength" of this novel sprue design, when employed in an optical disk mold which forms the centerhole by tearing out the sprue.

BACKGROUND OF THE INVENTION

Eichlseder method (U.S. Pat. No. 4,880,587) and apparatus (U.S. Pat. No. 4,738,613) teaches a way to form the centerhole in an injection molded optical disk by selective mechanical retention via undercuts molded into portions of the sprue element, such that when a certain sequence of ejector motions is employed, the sprue is separated away from the molded disk, before either are ejected out of the optical disk moldset, by a tearing action of the annular film gate connecting the sprue element to the molded disk. Although other ways of forming the centerhole in an optical disk are well known and described in other prior art patents, the Eichlseder teachings are employed in commercially available Krauss Maffei compact disk (CD) molds, which are believed to be the single most successful brand of CD molds, with over 300 such molds installed worldwide.

Applicants U.S. Pat. No. 5,068,065 issued Nov. 26, 1991 and incorporated herein by reference teaches an alternative to Eichlseder, wherein a "hollow sprue" geometry is employed for faster cooling rates and greater ease of filling and packing. This patent also teaches alternative ways to form the centerhole, such as a "molded in" centerhole formed when the annular gate aperture between sprue and disk is mechanically closed before the plastic therein is solidified. Although Applicants' invention may have technical merits in newly-designed CD molds, the great commercial success of Eichlseder is duly noted. Retrofits of the hollow sprue type into such existing CD molds of the Eichlseder type may not be practical or economically feasible. Therefore, Applicants have set about to find ways of improving the existing Eichlseder CD molds without "major surgery".

When Eichlseder CD molds were first commercialized, the state-of-the-arts molding cycle time was 9-10 seconds. Cycle time has been reduced now to the 5 second range. Therefore, it is not surprising that whereas the Eichlseder sprue can run problem-free at the original longer cycle times, problems occur at total cycle times of 5 seconds or less, wherein the cooling time portion is less than or equal to 3.0 seconds. The onset of failure is that, when the Eichlseder sprue is not yet sufficiently solidified, the mechanical forces of the ejector pin (which strips the sprue away from the ejector core's undercut) will exceed the "hot strength" of the B side portion of the sprue, and plastic deformation occurs. If the plastic deformation of the sprue only results in some small bulging, this is not a functional problem. But if the ejector pin forces are sufficiently greater than the hot strength of the sprue resisting these forces, the ejector pin (moving from the movable B side of the mold towards the stationary A side of the mold) actually tears right through the sprue, leaving the sprue's flange separated from the conical "funnel" upstream portion. Once the sprue is torn in two parts as described herein, the sprue cannot cleanly be ejected and the sprue "part verification" circuit will trip an alarm and automatic molding cycle interruption will occur, resulting in downtime. In the Eichlseder molds, this onset of failure is noted when the cooling time becomes less than or equal to 3.0 seconds, which tends to correspond to a total cycle time of 5.0 to 5.5 seconds total cycle time. To get below this threshold value in cycle time requires some improvements to be made.

Cecchi (U.S. Pat. No. 4,069,003) teaches the use of a fluted sprue bushing to form a concentric pattern of rib elements molded into the circumferential surfaces of the upstream portion of the sprue (defined herein as that conically shaped tapered portion starting with the junction with the nozzle tip and ending with the plane of the parting line, wherein lies the flange and optical disk). This ribbing is claimed to provide for faster cycling for those cases where the sprue is the slowest portion of the injection molded shot (consisting of the molding product plus the sprue and runner system), in which case if the sprue is slower to become sufficiently rigid for ejection and transfer out of the mold of the molded product, then such an approach can be useful.

However, in the case of optical disk injection molding, a mere combination of Eichlseder with Cecchi is not useful, because Cecchi teaches placing his ribs onto the portion of the sprue located between the injection molding machine's nozzle tip and the mold cavity wherein the molded article is formed. Cecchi ribs made optimally large enough to provide some structural rigidity to the sprue while hot would also cause disruption of the injected molten plastic as it flows between the injection molding machine's nozzle tip and the mold cavity, thus creating into the disk a "starburst" radial flow pattern. These non-uniform meltfront flow rates (with faster flow at the relatively less obstructed fluted rib crosssections having a relatively more open aperture to flow, and the more constrictive adjacent root-diameter conical sections having a greater restriction or impedence to flow) will result in cosmetic flowlines, as well as a "starburst" radial pattern of unacceptably high birefringence (molded-in stress, seen under polarized light) which would be a functional problem to the proper playing of compact disk, since the laser beam will be deflected by this non-uniform pattern of molded in stress.

Most importantly, Cecchi teachings apply to only to rigidifying the sprue only between the injection molding machine's nozzle tip and the mold cavity. However, it is the movement of the ejector pin which causes plastic deformation on the B or moveable ("displaceable") half side of the sprue and not on the A or stationary half side of the sprue (when viewed with respect to the parting line as the division between A and B side of the optical disk mold). In other words, it is the defficiencies of hot strength on the B side, not the A side, which are the current limitations to the Eichlseder sprue. Cecchi contributes nothing to the B side problems of the sprue; his drawings do not even show that portion of the sprue.

Even if it were permissable to apply, by hindsight, to employ Cecchi ribs onto the B side of the sprue to thereby rigidify the Eichlseder sprue against the compressive deformation of the ejector pin, Applicants have found, only certain geometries of these B side ribs avoid the disruption of flowfront problems mentioned earlier. Refer to details of the Applicants specification, herein.

Unlike Cecchi, Marsh (U.S. Pat. No. 2,306,316) does deal with problems related to the B side or ejector side of the sprue but merely teaches how to improve cooling rate of that portion of the sprue, by inserting a cooling finger element actively cooled by circulation of heat transfer fluid. Such a hollowed-out base of the B side of the sprue by itself contributes nothing to the Eichlseder problem. The inside and outside surfaces formed in the Marsh design are shown to be of a smooth conical taper (no ribs), as is the case with all the other known prior art, particularly those many optical disk-specific prior art references cited in Applicants' U.S. Pat. No. 5,068,065.

SUMMARY OF INVENTION

The present invention is a practical and economical way to retrofit existing Eichlseder-type optical disk molds to overcome the cycle time limitation described herein. Specifically, Applicants' changes in the B side geometry of the Eichlseder sprue impart a greater "hot strength" and resistance to plastic deformation by the ejector pin, such that the ejector pin is unable to tear through the still-hot plastic and thus cause tearing apart of the sprue and thus resulting in stoppage of production. The present invention employs a plurality of molded-in ribs, circumferentially spaced and extending between the B side surface of the sprue flange (the flange is substantially located in the plane of the molded disk) and extending substantially downstream to the juncture with the ejector pin sprue-forming surfaces of the mold.

Each of this plurality of ribs has a certain depth, width, and spacing with respect to the next adjacent rib, which thereby define the rib pattern and its effectiveness as an improvement on Eichlseder. Applicants' experimentation has shown that some of these geometries work better than others, and these findings are described in more detail in this specification.

Furthermore, the interaction of this rib geometry and pattern is interactive with the design parameters relating to the mechanical retention and undercut inherent to Eichlseder in order to be able to properly tear out the centerhole. Specifically, the greater the amount of undercut provided by the Eichlseder sprue, the easier it is to tear the film gate. The thicker the film gate of Eichlseder, the easier it is to properly fill pack and otherwise mold a satisfactory quality CD. However, the thicker the film gate, the harder it is to properly tear out the centerhole. Thus, the desirability of increasing the amount of undercut to such mold design of the Eichlseder type. However, if the undercut is thus increased in the B side geometry of the flange of Eichlseder sprue, a corresponding increase in ejector pin force is needed to strip the sprue off the undercut, or else the sprue "sticks" (i.e., the sprue is not successfully displaced so that it can drop free at the end of the molding cycle). On the other hand, if the ejector pin force is increased as needed to sustain the larger and larger undercuts, then there is an earlier onset of the sprue tearing problem as previously described. The present invention is the answer to this problem.

DETAILED DESCRIPTION OF THE INVENTION

Figure 1B:
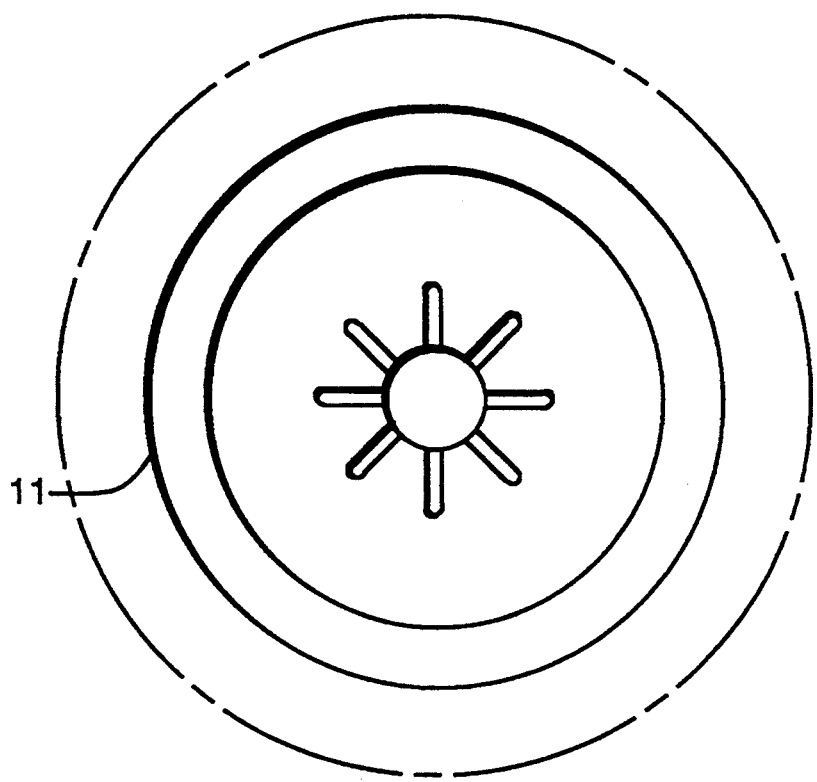
FIG. 1B shows a plan view (looking in at the B side of the optical disk injection mold of the present invention, showing the sprue cavity and mold elements surrounding it, from of the parting line) of same partial view as shown in FIG. 1A.
Figure 1A:
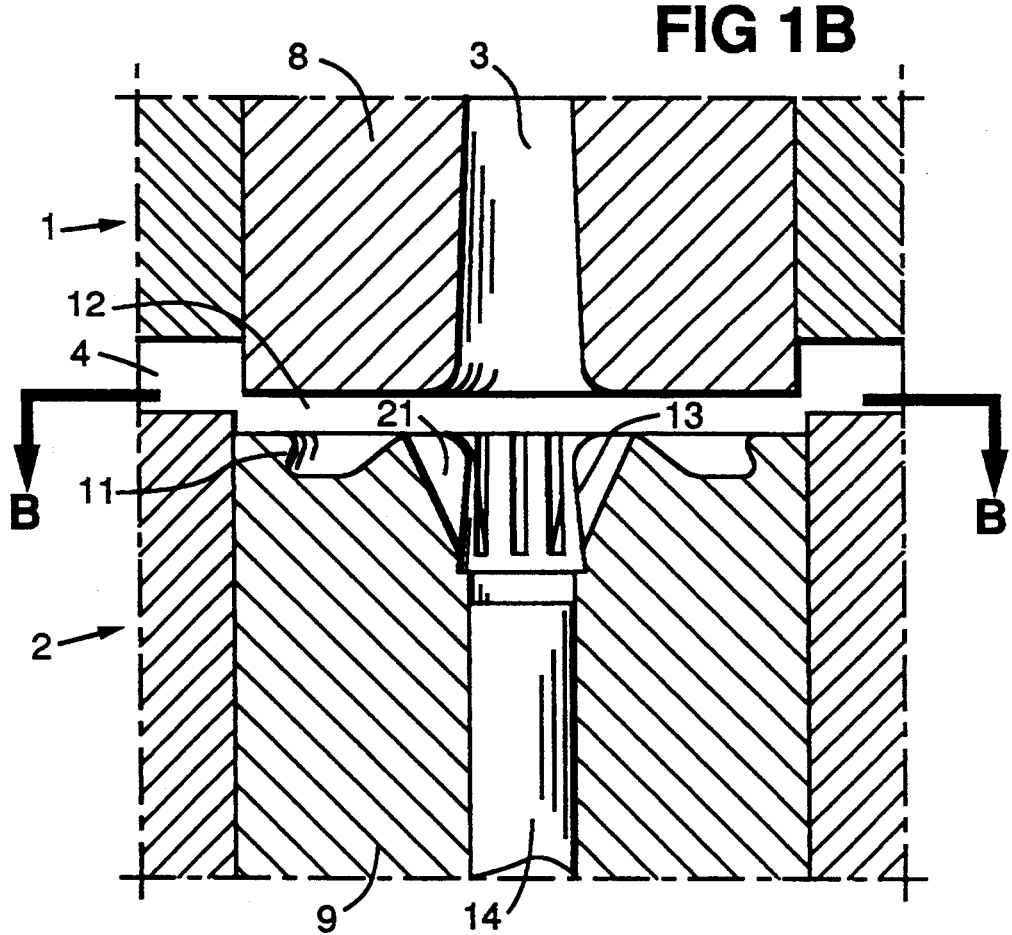
FIG. 1A shows a partial cross-sectional view of the optical disk injection mold of the present invention, showing the sprue cavity and mold elements surrounding it.
Figure 2B:
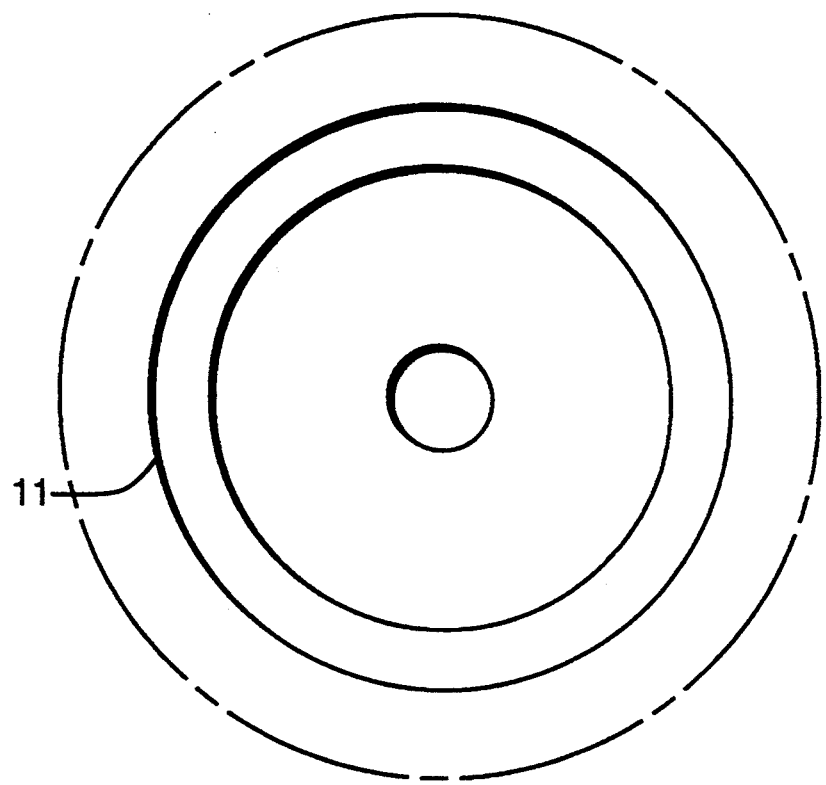
FIG. 2B shows a plan view (looking in at the B side of the optical disk injection mold of a "Comparative Example" of the prior art Eichlseder type without the present invention, showing the sprue cavity and mold elements surrounding it, from of the parting line) of same partial view as shown in FIG. 2A.
Figure 2A:
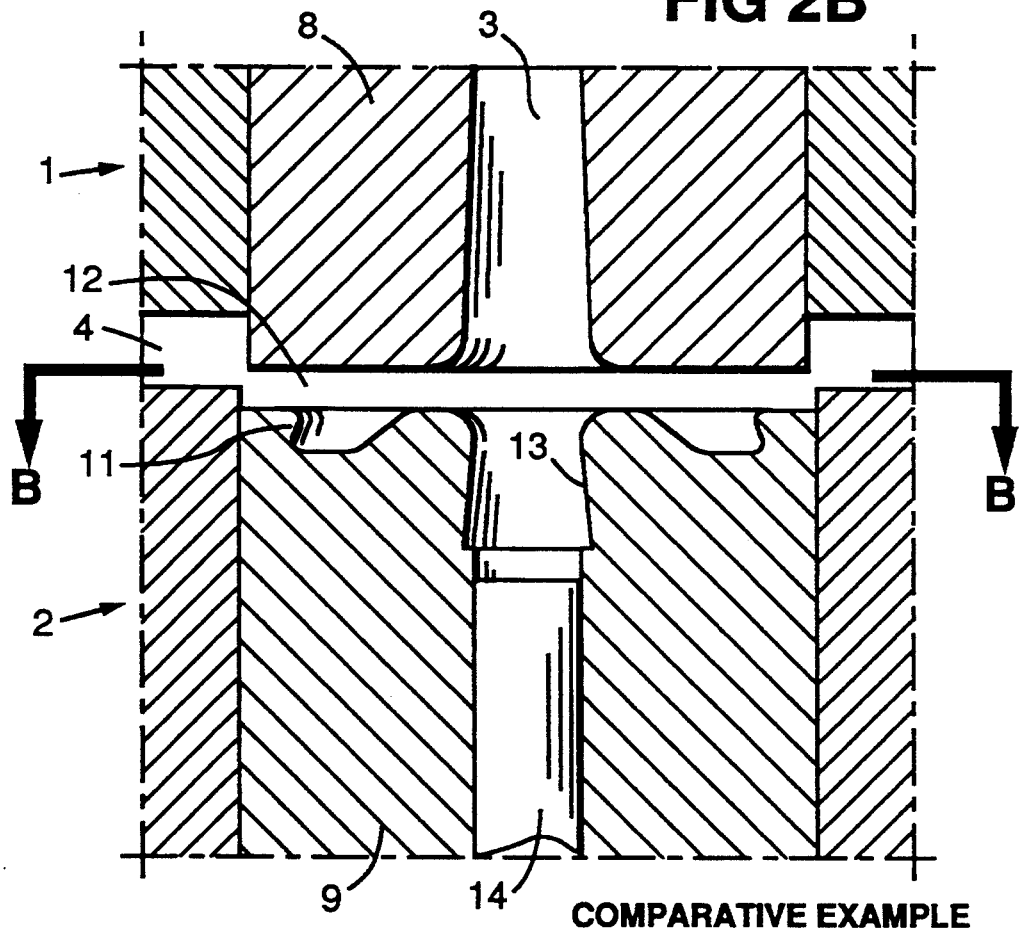
FIG. 2A shows a partial cross-sectional view of the optical disk injection mold of a "Comparative Example" (the prior art Eichlseder type without the present invention), showing the sprue cavity and mold elements surrounding it.

FIGS. 1A and 1B shows Applicants' improved sprue for faster cycling injection molding of optical disks employing the Eichlseder type molds. Note that when comparing to FIGS. 2A and 2B Comparative Examples of the standard Eichlseder type sprue, there are both similarities and differences. The A side, or stationary half of the optical disk moldset, of the sprue is unchanged from the standard Eichlseder type. All the changes are on the B side, or displaceable half, of the Eichlseder sprue.

Refer now to FIGS. 1A & 2A. In each, the optical disk injection moldset (shown in partial cross-sectional view) includes a stationary half (1) and an axially displaceable half (2), each partially defining a sprue cavity within which a sprue (3) is formed, with a flange (12) in fluid communication with an optical disk mold cavity (4) during the injection step, through a bushing (8) exhibiting an axial extension beyond the stationary half, the bushing defining a sprue funnel and the extension exhibiting an external diameter corresponding to and partially defining an internal aperture in the optical disk mold cavity, so that when the optical disk (4) is solidified by cooling, the flange and sprue are still attached to the optical disk until the mold starts to be opened. Of interest is the elements of and workings of the displaceable half.

An axially moveable sleeve (9) with a conical narrowing provided to form an undercut (11) in the flange (12) of the sprue (3) and with a further narrowing member (13) for centered holding of the sprue (3) is located within the displaceable half (2). An axially displaceable ejector pin (14) is guided within sleeve (9) for the ejection of the sprue (3). In operation, after the optical disk (4) is solidified by cooling, and the flange and sprue are still attached to the optical disk, when the mold is opened, the sprue (3) is held securely by the sleeve through undercut (11) until axial displacement (retraction rearward toward the clamp end of the injection molding machine, not shown) of sleeve (9) separates the optical disk (4) from the sprue (3) and flange (12), thus "tearing out" the sprue to form a centerhole in the optical disk. Further axial displacement/retraction rearward brings the sprue to a desired location for ejecting the sprue off the sleeve, by forward extension axial displacement of the ejector pin (14), whose face now presses against the further narrowing member (13) until force exerted thereby is greater than the retentive forces holding the sprue onto the sleeve, thus freeing the sprue to drop away.

Note that in FIG. 1B (plan view of the B side Applicants' invention, viewed from the open parting line) but not in FIG. 2B (Comparative Example of the "prior art" Eichlseder type of sprue), there is a plurality of molded-in rigidifying ribs (formed within a mating plurality of female rib cavities cut into the axially displaceable sleeve) substantially uniformly spaced circumferentially about the further narrowing member and substantially extending axially from a displaceable half surface plane of the sprue flange (12) to a surface juncture with the axially displaceable ejector pin (14). This plurality of ribs are provided which run circumferentially around the root diameter of the B side of the sprue. These ribs can vary in their spacing, depth and width and angulation, as previously noted. The working combination must resist the axially-exerted compressive forces being applied when the ejector pin comes forward while at the same time the ejector core is still binding the sprue in place by means of the Eichlseder undercuts on the B side of the sprue flange element. When sprue-tearing failure occurs, the ejector core-and-pin assembly is functioning as though it were a shearing die set, wherein the undercuts hold and bind the sprue flange in place against the ejector core and the ejector pin forces exceed the hot strength of the plastic causing deformation, until the pin shears right through the plastic sprue.

It has been found by Applicants' experimentation that, even though the ejected molten plastic flows from the A side into the parting line-plane of the disk cavity, if too great an interruption is made on the B side of the sprue geometry, there can also be the onset of the radial non-uniform birefringence pattern (appearing as starburst or spokes of a wheel). With this preferred eight rib pattern, the onset of this radial non-uniform birefringence pattern was noted at greater than or equal to 0.020 inches (0.50 mm). There are obvious tradeoffs. If the rib is too thin (i.e., much less than 0.010 inches) (0.25 mm), then the rib is too thin to provide enough mechanical resistance to the ejector pin's compression forces and it can still be plastically deformed, to cause sprue tearing failures. Actually, if even smaller ribs than these are selected, the impedence to filling by the injection molded plastic actually does not fully form the rib in achieving its nominal design dimensions.

Applicants have observed there is a tradeoff in rib geometry and thermodynamics also. Specifically, on each injection molding cycle, a certain heat load is introduced into the mold and this number of calories or BTUs must be removed/dissipated within the cycle to provide a stable and/or handlable plastic product/sprue. Adding more and more number of ribs runs into a point of diminishing returns, since the metal between these ribs must transfer this inputted thermal energy via a heat flux distribution pattern to minimize the cycle times. In other words, just increasing the number of ribs and thereby increasing the total surface area of those ribs might appear to provide faster cooling but if you slice the metal too thin, then you have needle-like projections of the metal in between the plastic, which would be a reduction in effective heat dissipation geometry. Applicants recommend no greater than 12 ribs, at a uniform radial spacing between ribs of 30 degrees, and they extend radially out at least 0.5 mm (0.020") into the flange, and they rise up from the surface of the flange toward the ejector pin.

In a preferred embodiment, shown in FIG. 1B, the number of ribs are 8, they extend radially out 1.2 mm (0.048") into the flange, and they rise up from the surface of the flange toward the ejector pin. In this preferred embodiment, the rib profile is substantially a right triangle with the vertical leg being the root diameter of the further narrowing member, the length of the extended horizontal leg which runs along the flange is about 1.2 mm long and the rib width is relatively modest, about 0.35 mm (0.014 inches)

An actual molding test was made in a Krauss Maffei mold of the Eichlseder type. First, the standard Eichlseder sprue was run and the onset of failure was observed at about 3.0 seconds of cooling time. Then the cooling core was re-machined, to cut in radially a pattern of female rib cavities of the type shown in FIG. 1. As described in the above-mentioned "preferred embodiment", total number of ribs was 8 and rib width was 0.35 mm (0.014 inches) and they extended radially 1.2 mm (0.048") along the flange surface. This geometry was then run under identical molding processing conditions in the Krauss Maffei mold, and now a much faster cycle time could be achieved, since cooling time could be reduced to the range of 2.0–2.5 seconds in time before the onset of sprue tearing was again observed.

Although the reduction in cooling time from 3.0 to 2.0–2.5 may sound trivial, in a 5 second cycle, ½ to 1 second cycle savings is a 10–20% increase in output, and is produced by relatively low cost and very practical retrofit change.

We claim:

1. An injection mold apparatus for molding optical disks comprising:

a stationary half partially defining an optical disk mold cavity;

a bushing exhibiting an axial extension beyond said stationary half, said bushing defining a sprue funnel and said extension exhibiting an external diameter corresponding to and partially defining an internal aperture in said optical disk mold cavity;

a displaceable half partially defining said optical disk mold cavity and exhibiting an internal diameter defining, circumferentially, a sprue flange cavity;

an axially displaceable sleeve within said displaceable half partially defining a sprue cavity exhibiting a sprue flange undercut means for retaining a sprue flange and an axial conical narrowing means for retaining a sprue, and said partially defined sprue cavity within said displaceable half also exhibiting a further narrowing member extending axially from a displaceable half surface plane of said sprue flange to a surface juncture with an axially displaceable means for ejecting said sprue, said member having a plurality of molded-in rigidifying ribs formed within a mating plurality of female rib cavities cut into said axially displaceable sleeve, said plurality of ribs being substantially uniformly spaced circumferentially about said member and substantially extending axially from said surface plane of said sprue flange to said surface juncture with said axially displaceable means for ejecting said sprue; and, said axially displaceable means for ejecting said sprue guided in said sleeve.

2. An injection mold apparatus for molding optical disks of claim 1 wherein each of said ribs is less than 0.50 mm (0.020) wide but at least 0.25 mm (0.010) wide.

3. An injection mold apparatus for molding optical disks of claim 1 wherein each of said ribs is 0.35 mm (0.014") wide.

4. An injection mold apparatus for molding optical disks of claim 1 wherein said plurality of ribs formed within a mating plurality of fluted cavities cut into said axially displaceable sleeve are no greater than 12 in number, each one spaced at least 30 degrees apart in uniform radial distribution.

5. An injection mold apparatus for molding optical disks of claim 1 wherein said plurality of ribs formed within a mating plurality of fluted cavities cut into said axially displaceable sleeve are 8 in number, each one spaced 45 degrees apart in uniform radial distribution.

6. An injection mold apparatus for molding optical disks of claim 1 wherein said plurality of ribs uniformly spaced circumferentially about said member and substantially extending axially from said surface plane of said sprue flange to said surface juncture with said axially displaceable means for ejecting said sprue are radially extended along said surface plane of said sprue flange at least 0.5 mm (0.020″).

7. An injection mold apparatus for molding optical disks of claim 1 wherein said plurality of ribs uniformly spaced circumferentially about said member and substantially extending axially from said surface plane of said sprue flange to said surface juncture with said axially displaceable means for ejecting said sprue are radially extended along said surface plane of said sprue flange at 1.2 mm (0.048″).

8. An improved injection mold apparatus for molding optical disks comprising a stationary half partially defining an optical disk mold cavity and a bushing exhibiting an axial extension beyond said stationary half, said bushing defining a sprue funnel and said extension exhibiting an external diameter corresponding to and partially defining an internal aperture in said optical disk mold cavity and a displaceable half partially defining said optical disk mold cavity and exhibiting an internal diameter defining circumferentially a sprue flange cavity, and an axially displaceable sleeve within said displaceable half partially defining a sprue cavity exhibiting a sprue flange undercut means for retaining a sprue flange and an axial conical narrowing means for retaining a sprue, and an axially displaceable means for ejecting said sprue guided in said sleeve, wherein the improvement comprises said partially defined sprue cavity within said displaceable half also exhibiting a further narrowing member extending axially from a displaceable half surface plane of said sprue flange to a surface juncture with said axially displaceable means for ejecting said sprue, said member having a plurality of molded-in rigidifying ribs formed within a mating plurality of female rib cavities cut into said axially displaceable sleeve, said plurality of ribs being substantially uniformly spaced circumferentially about said member and substantially extending axially from said surface plane of said sprue flange to said surface juncture with said axially displaceable means for ejecting said sprue, such that said ribs resist mechanical compressive deformation while said sprue is still hot and said axially displaceable means for ejecting said sprue are exerting force against said member while said sprue is still being held onto said sprue flange undercut means for retaining a sprue flange and/or said axial conical narrowing means for retaining a sprue, thereby allowing for faster injection molding cycling time.

9. An injection mold apparatus for molding optical disks comprising:

a stationary half partially defining an optical disk mold cavity;

a bushing exhibiting an axial extension beyond said stationary half, said bushing defining a sprue funnel and said extension exhibiting an external diameter corresponding to and partially defining an internal aperture in said optical disk mold cavity;

a displaceable half partially defining said optical disk mold cavity and exhibiting an internal diameter defining, circumferentially, a sprue flange cavity;

an axially displaceable sleeve within said displaceable half partially defining a sprue cavity exhibiting a sprue flange undercut means for retaining a sprue flange and an axial conical narrowing means for retaining a sprue, and said partially defined sprue cavity within said displaceable half also exhibiting a further narrowing member extending axially from a displaceable half surface plane of said sprue flange to a surface juncture with an axially displaceable means for ejecting said sprue, said member having a plurality of molded-in rigidifying ribs formed within a mating plurality of female rib cavities cut into said axially displaceable sleeve, said plurality of ribs being substantially uniformly spaced circumferentially about said member and substantially extending axially from said surface plane of said sprue flange to said surface juncture with said axially displaceable means for ejecting said sprue and said plurality of ribs radially extending along said surface plane of said sprue flange at least 0.5 mm (0.020″), and said plurality of ribs are no greater than 12 in number, each one spaced at least 30 degrees apart in uniform radial distribution and less than 0.50 mm (0.020) wide but at least 0.25 mm (0.010) wide; and, said axially displaceable means for ejecting said sprue guided in said sleeve.

* * * * *